INVENTOR.
Karl Maiershofer

INVENTOR.
Karl Maiershofer
BY Olson, Trexler
Wolters & Bushnell
attys

United States Patent Office

3,138,062
Patented June 23, 1964

3,138,062
AUTOMATIC SLIDE PROJECTOR
Karl Maiershofer, Park Ridge, Ill., assignor to G-M Laboratories Inc., Chicago, Ill., a corporation of Illinois
Filed Jan. 3, 1962, Ser. No. 164,042
20 Claims. (Cl. 88—28)

This invention relates generally to apparatus for use in viewing photographic slides and especially to automatic slide projectors.

In one specific aspect, the present invention relates to an automatic slide projector in which photographic slide transparencies are vertically transported between a levelly positioned, slide-carrying tray and a viewing frame located vertically thereabove.

A general object of the present invention is to provide a new and improved photographic slide projector.

Another object of the invention is to provide an automatic photographic slide projector incorporating a novel operating mechanism.

And another object of the present invention is to provide photographic slide projection apparatus having a new and improved shutter arrangement.

Yet another object of the invention is to provide photographic slide projection apparatus having a shutter mechanism which is positively coordinated with actuation of the slide changer mechanism.

And still another object of the invention is to provide photographic slide projection apparatus in which the shutter normally remains closed until a slide is properly positioned in the viewing frame.

A further object of the invention is to provide a photographic slide projector incorporating a novel editing arrangement.

A yet further object of the invention is to provide a photographic slide projector wherein the editing arrangement cooperates with the slide changer mechanism in providing positive gripping of the slide which is being transported for viewing.

A still further object of the invention is to provide a photographic slide projector incorporating an editing arrangement which cooperates in establishing bias for returning the slide from the viewing frame to the tray.

And a still further object of the invention is to provide photographic slide projection apparatus which is arranged to avoid damaging the slides upon improper manipulation of the editing arrangement.

Additional objects and features of the invention pertain to the particular structure and arrangements whereby the above objects are attained.

Apparatus in accord with the invention includes a structure defining a pathway for a slide-carrying tray; a plate defining a viewing frame above the pathway; drive means including a rotatable power shaft; clutch means movable in a path into and out of engagement with the power shaft; mechanical means for moving the clutch means; means periodically operating the mechanical means to cause movement of the clutch means out of engagement with the power shaft; a rotatable operating shaft spaced apart from the power shaft; means operative between the power shaft and the operating shaft for transmitting oscillatively rotatable motion to the operating shaft; indexing means for stepwise advancing the slide-carrying tray, including pinion means adapted to mesh with a rack on the tray and a cockable and reciprocable pawl cyclically engaging and rotating the pinion means; cam means interconnected between the operating shaft and the indexing means for actuating the pawl; pusher arm means including a vertical guideway underlying the pathway, a pusher arm slidably received in the guideway for endwise engaging a photographic slide carried by the tray, and means connecting the pusher arm to the operating shaft whereby the oscillatively rotatable motion of the operating shaft causes vertical sliding of the pusher arm for transporting a slide to and from the viewing frame; shutter means for selectively obstructing the passage of light rays along the optical path through the viewing frame, including a shutter blade and means hinging the shutter blade for swinging movement into and out of the optical path, the hinge axis of the shutter blade being disposed transversely of and spaced-apart laterally from the optical path; and editing lever means including a pair of levers pivoted about a common axis disposed parallel to and spaced laterally apart from the optical path, manually operable lever means connected to one of the levers for pivoting that lever in a predetermined arc of movement, and stop means on the free ends of the levers aligned with the plane of the pusher arm in confrontable relationship with the upper end of the pusher arm for gripping a slide therebetween.

The invention, both to its structure and mode of operation, will be better understood by reference to the following disclosure and drawings forming a part thereof, wherein.

Figure 1:
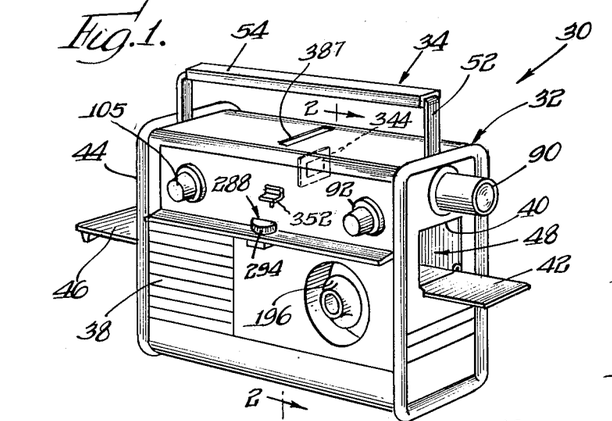
FIG. 1 is a perspective view of photographic slide projection apparatus constructed in accordance with the principles of the invention.
Figure 2:
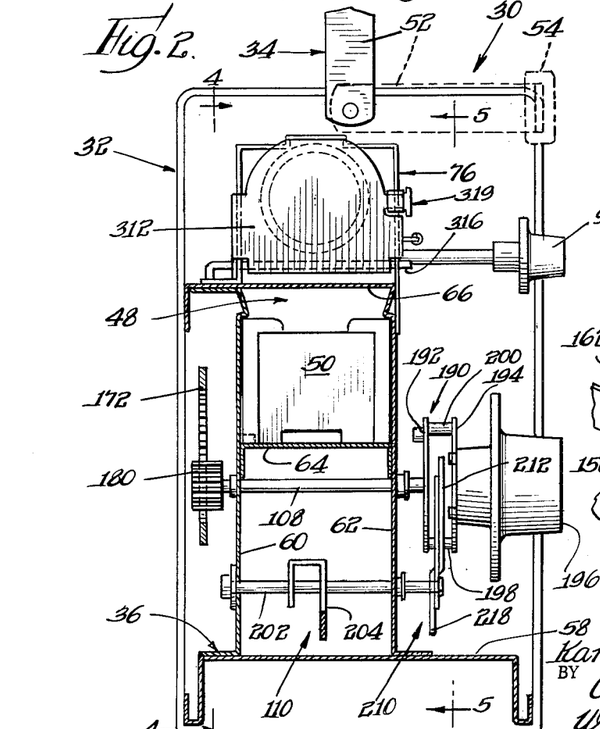
FIG. 2 is an enlarged elevational view taken through the section 2—2 of FIG. 1.

Referring now in detail to the drawings, specifically to FIGS. 1 and 2, a photographic slide projector indicated generally by the numeral 30 will be seen to include a housing structure 32, a handle arrangement 34 and an interior structural framework 36. The housing structure 32 takes narrow, upright, rectangular form and incorporates a louvered side panel 38 which in conjunction with other suitable openings, not shown, allows free passage of air for cooling and ventilation. The housing structure 32 also includes a tray exit opening 40 closed by means of a hinged front door 42 and a tray entrance opening 44 closed by a hinged back door 46. The entrance opening 40 and the exit opening 44 are aligned with a horizontal tray tunnel or pathway 48 which is defined by the structural framework 36 and which is adapted to receive and pass a slide-carrying tray or magazine such as the magazine shown generally at 50 in FIG. 2.

The downward swinging motion of the hinged doors 42 and 46 is arranged to be arrested when the doors reach a horizontal position generally coplanar with floor of tray tunnel 48. In such position, the doors 42 and 46 define platform extensions of the tray tunnel to facilitate handling of the slide-carrying trays. For storage or transportation of the slide projector 30, the doors 42 and 46 are swung upwardly to obstruct the exit opening 40 and the entrance opening 44 respectively, thus closing off the tray tunnel 48.

Figure 3:
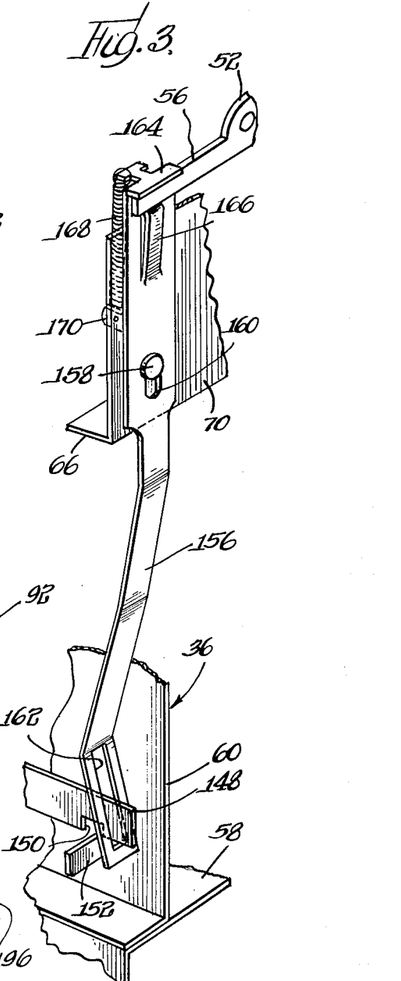
FIG. 3 is an enlarged perspective view of the tripping mechanism for the slide changer.

The handle arrangement 34 includes a metal strap 52 formed to C-shape and pivotally mounted at its ends to the structural framework 36 for swinging in a 90° arc established by stop means, not shown, the extreme positions of the handle arrangement 34 being illustrated in FIG. 2 as an upright position shown in solid outline wherein the handle arrangement may be used for carrying the slide projector 30 and a horizontal position shown in broken outline wherein the handle is folded snugly into conformity with the general outline of housing structure 32. To afford comfort in carrying the slide projector 30 and to enhance the decorative quality thereof, a resinous plastic bar 54 is molded about or otherwise suitably secured to the horizontally extending portion of the strap 52. In addition, the end of strap 51 which is situated adjacent the entrance opening 44 is provided with an extending tongue 56, shown in FIG. 3. Tongue 56 is adapted to operate the trip mechanism for the changer as will be brought out more fully hereinafter.

Figure 4:
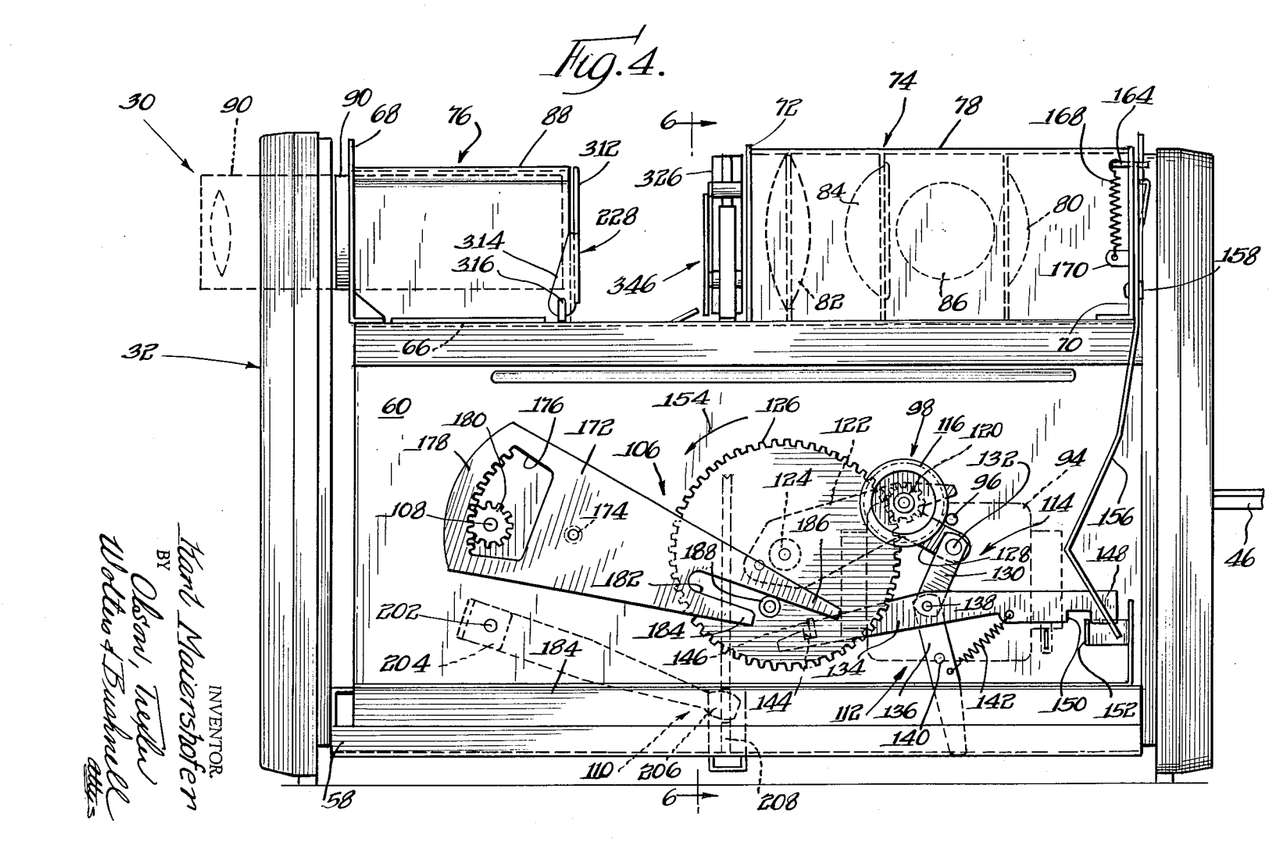
FIG. 4 is a view in side elevation taken through the section 4—4 of FIG. 2.
Figure 6:
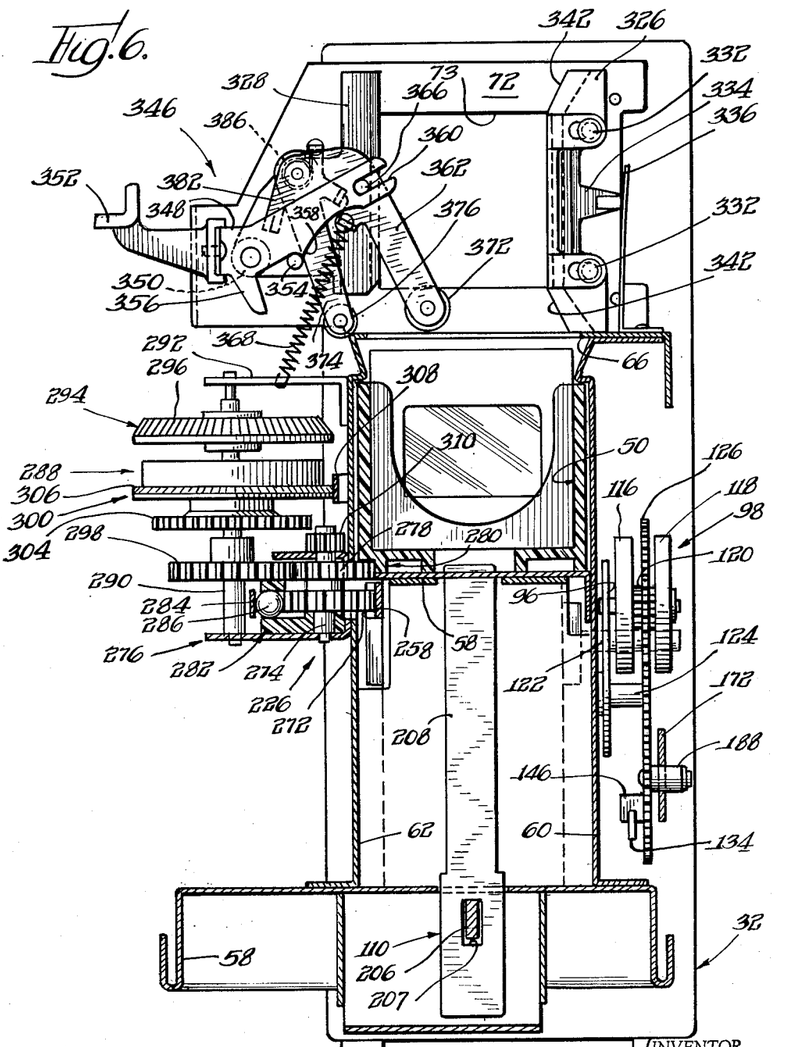
FIG. 6 is an enlarged view taken in end elevation through the line 6—6 of FIG. 4, illustrating in particular the editing lever arrangement in its normal or rest position.

The interior structural framework 36 comprises a base or pedestal defined by a downwardly opening, horizontal channel member 58, vertical side plate members 60 and 62 rigidly upstanding from the base in spaced-apart relationship, a horizontal channel member 64 secured between the side plate members to define the floor of tray tunnel 48, and a horizontal top plate member 66 forming the roof of the tray tunnel at the upper terminal ends of the side plate members 60 and 62. The structural framework 36 also includes vertical end plate members 68 and 70 upstanding from opposite ends of top plate member 66 as is shown in FIG. 4. Intermediate the end plate members 68 and 70, the structural framework 36 includes a vertical plate 72 which is rectangularly apertured to define a viewing frame 73 located in a position above the tray tunnel 48. This is shown in FIG. 6.

As will be described more fully hereinbelow, the photographic slide projector 30 incorporates means for transporting a photographic slide between the tray 50 and the viewing frame 73 for purposes of projecting the subject matter incorporated on the slide. Accordingly, the slide projector 30 includes means defining an optical path through the aperture of viewing frame 73; and with particular reference to FIG. 4, these means will be seen to comprise an optics arrangement made up of a light beam unit 74 and an adjustable. projection lens assembly 76. The light beam unit 74 includes a housing 78 that encloses suitable optical elements such as a reflector 80, lenses 82 and 84, and a light source provided by a lamp 86. The light beam unit 74 is situated optically preceding the viewing frame 73 whereas the projection lens assembly 76 is disposed optically subsequent to the viewing frame. The lens assembly 76 comprises a housing 88 which telescopically receives a tubular, lens-carrying element 90. Element 90 is reciprocally operated by a manual control knob 92, shown in FIG. 1, acting through a gear train, not illustrated.

The slide projector 30 is intended primarily for automatic operation. Therefore, an electric motor shown at 94 in FIG. 4 is mounted between the side plate members 60 and 62 to extend a rotatable power shaft 96 through the side plate member 60 where it is in position to be engaged by a clutch unit 98, clutch unit 98 comprising part of the slide changer mechanism. The opposite end of power shaft 96 extends through the side plate member 62 to operate a squirrel cage fan 100 shown in FIG. 5. The fan 100 delivers air under pressure through a duct 102 into the viciniaty of lamp 86 for purposes of dissipating the heat generated by the lamp so as to preclude the possibility of thermal damage to the photographic slides being projected.

Figure 5:
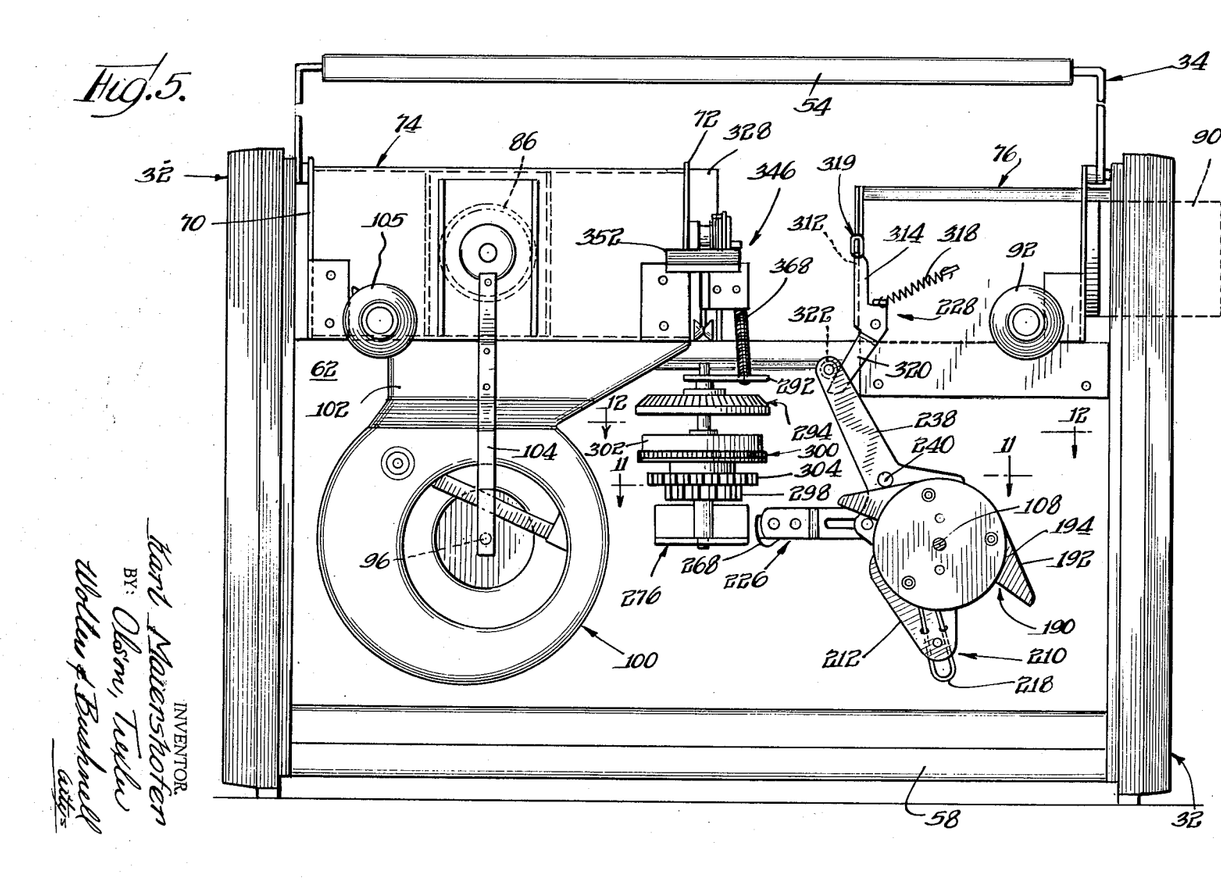
FIG. 5 is a view in side elevation taken through the section 5—5 of FIG. 2.

Advantageously, a fly-ball governor, not shown, is associated with motor 94 to operate a contact leaf 104 for conditioning the electric circuit to lamp 86 whenever the fan 100 is rotating, thus preventing energization of lamp 86 in the absence of cooling air currents from the fan. A control knob 105, shown in FIGS. 1 and 5, is employed for selectively energizing the circuits to motor 94 and fan 100.

Continuing with reference to FIG. 4, the slide changer mechanism will be seen to include, in addition to the clutch unit 98, a power transmitting assembly 106, a main or changer operating shaft 108, a pusher arm unit 110 and a latch-operate mechanism 112. The changer mechanism also includes a mechanical assembly 114 for directing the engagement and disengagement of clutch unit 98 with the power shaft 96 for actuating the latch-operate mechanism 112.

With particular reference now to FIGS. 4 and 6, the clutch unit 98 will be seen specifically to comprise a pair of rubber-tired wheels 116 and 118 which are axially spaced apart by a pinion gear 120 joined rigidly therebetween. The resultant assembly is journaled to an arm 122 which is swingably mounted on a shaft 124. Shaft 124 is also employed in rotatably mounting a spur gear 126 to the side plate member 60, spur gear 126 meshing with pinion gear 120. Accordingly, when the friction-surfaced wheels 116 and 118 edgewise engage the rotating shaft 96, rotational energy is transmitted from the shaft 96 to the spur gear 126.

Arm 122 is provided with an offset finger portion 128 to the end of which a link 130 is pivotally connected by a rivet 132, as is best shown in FIG. 4. The link 130 is pivotally connected both to a horizontal arm 134 and to a lever 136 by a rivet 138. The lever 136 additionally pivots about a stub shaft 140; and a tension spring 142 extends between arm 134 and lever 136 in the position shown in order to bias the wheels 116 and 118 into engagement with power shaft 96 and in order to bias the arm 134 toward the left side of the apparatus as it is viewed in FIG. 4. One end of arm 134 is fashioned with a notch 144 for cooperatively receiving an abutment member defined by an ear 146. Ear 146 is struck laterally out from the gear 126 in a position radially apart from the shaft 124 by which the gear is mounted in the apparatus.

The other end of arm 134 is arranged to define a bolt 148 which is provided with a notch 150. A cooperatively positioned strike plate 152 is struck laterally out from the side plate member 60 in a position to be engaged by the notch 150 of bolt 148. Thus, abutment of ear 146 with a side of notch 144 and rotation of spur gear 126 in the direction indicated by arrow 154 will urge the arm 134 in opposition to the bias of spring 142 so as to cause the bolt 148 to move into latched engagement with the strike plate 152. Simultaneous movement of the pivot defined by rivet 138 will swing arm 122 in the direction of arrow 154 causing wheels 116 and 118 to be disengaged from power shaft 96, thus isolating the slide changer mechanism from the rotational energy being delivered by motor 94. A cyclical transfer of power from shaft 96 is thereby realized.

In order to unlatch arm 134, a tripping lever 156 is vertically slidably mounted to end plate member 70. A rivet 158 operates in a slot 160 formed in the tripping lever 156, as is well shown in FIG. 3, to achieve this mounting. At its lower end, the tripping lever 156 is provided with a closed, rectangular slot 162 within the confines of which the bolt 148 reciprocates. At its upper end, the tripping lever 156 is provided with a flanged portion 164 acting as a stop for the tongue 56 of handle arrangement 34. A resilient leaf 166 is advantageously struck out from the tripping lever 156 underlying the flanged portion 164 for purposes of biasing the tongue 56 into engagement with the flanged portion 164; and a tension spring 168 extends between an ear 170 struck from the end plate 70 and an aligned region of flanged portion 164 whereby to bias the tripping lever 166 in a downward direction. The bottom of slot 162 depends sufficiently beneath the upper edge of strike plate 152 to permit latching of the arm 134 in the normal position of tripping lever 156.

Thus, when handle arrangement 34 is folded down into the position shown in broken outline in FIG. 2, manual depression of bar 54 pivots tongue 56 to lift the tripping lever 156; and the bottom edge of slot 162 engages the bottom edge of bolt 148 to lift notch 150 out of engagement with the strike plate 152. This action releases arm 134 to the bias of spring 142 and tilts the arm 134 about the pivot defined by the rivet 138 so as to release arm 146 from notch 144. These movements also combine to direct wheels 116 and 118 into engagement with power shaft 96 and to free spur gear 126 for rotation through one cycle, i.e. through one full circle of revolution, this cycle being terminated by ear 144 once again abutting the edge of notch 146 for urging arm 134 against the bias of spring 142 and into the latched condition relative to strike plate 152.

In order to convert the cyclical rotation of spur gear 126 to an oscillative rotation of operating shaft 108, the power transmitting assembly 106 is arranged to include a drive arm 172 which is pivotally mounted to a shaft 174 in order to swing in a plane parallel to and spaced apart from the plane of spur gear 126. With particular reference to FIG. 4, the drive arm 172 will be seen to be provided with an irregular opening 176 one side of which is provided with teeth in order to define an internal segment gear 178. A pinion gear 180 is fixed to shaft 108 in meshed engagement with the segment gear 178; and the drive arm 172 is fashioned in generally wedge-shaped outline, the opening 176 being provided in the broad end thereof and a radial slot 182 being provided at the narrow end. The center line of slot 182 intersects the axis of shaft 174 at right angles thereto, and the slot itself is laterally bounded by an abbreviated finger 184 and an elongated finger 186. A nylon roller 188 is mounted on the side of spur gear 126 spaced radially from the center thereof in order to ride in the slot 182. Thus, each rotative cycle of spur gear 126 causes drive arm 172 to oscillate about the shaft 174; and because of the meshed engagement of segment gear 178 and pinion gear 180, this oscillative movement of the drive arm 172 is transmitted to operating shaft 108.

Returning to FIG. 2, the pinion gear 180 will be seen fastened to one end of operating shaft 108 laterally outwardly of side plate member 60. To the opposite end of shaft 108, laterally outwardly of side plate member 62, there is fastened an actuating arrangement comprising a disc assembly 190. Assembly 190 includes an operating disc 192 and a knob mounting disc 194; and a manual control knob 196 is suitably fastened to the disc 194 to permit manual operation of the slide changer mechanism, disc 194 being secured to disc 192 in spaced-apart parallel relationship by rivets passing through tubular spacers, specifically through a lower tubular spacer 198 and a pair of upper tubular spacers 200.

Figure 11:
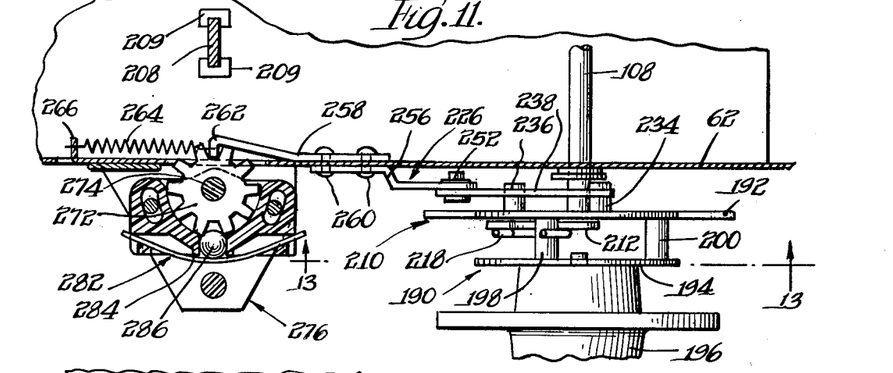
FIG. 11 is an enlarged plan view taken through the section 11—11 of FIG. 5.
Figure 12:
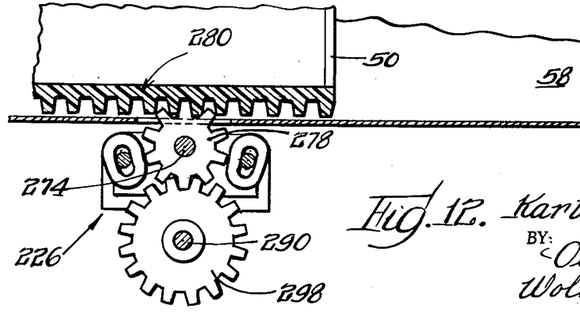
FIG. 12 is an enlarged plan view taken through the section 12—12 of FIG. 5.

Considering for the moment both FIGS. 2 and 4, the pusher arm unit 110 will be seen to include a shaft 202 journaled between the side plate members 60 and 62 parallel to and spaced-apart from operating shaft 108. A pusher arm operating lever 204 is fixed to shaft 202 to extend perpendicularly therewith, and the otherwise free end of lever 204 is provided with an enlargement or bulb-like formation 206 which enters and is adapted to ride in a closed slot 207 formed in a pusher arm 208 adjacent the lower end thereof, as is shown in FIG. 6. The pusher arm 208 is arranged to ride vertically in guides rigid with the side plate members 60 and 62 underlying the channel member 64 as is shown in FIG. 11. Thus, oscillative rotation of the shaft 202 is capable of causing vertical reciprocation of the pusher arm 208.

The desired oscillative rotation of shaft 202 is transmitted thereto from operating shaft 108 by means of a slide transport lever arrangement 210 affixed to shaft 202 laterally outwardly of the side plate member 62 and operatively engaging the disc assembly 190. As is illustrated in FIG. 2, the slide transport lever arrangement 210 is disposed between the discs 192 and 194. Turning to FIGS. 13–16, the arrangement 210 will be seen specifically to include a slide transport lever 212 which is rigidly mounted to shaft 202 and which is fashioned with a mouth 214 opening in a generally upward direction to surround the lower spacer 198. A restricted portion or throat 216 is located at the bottom of mouth 214 and is arranged to receive the spacer 198 in a manner soon to become apparent. The arrangement 210 also includes a retaining spring 218 which is provided with offset portions which pass through apertures 220 in the lever 212, as is well shown in FIG. 16, whereby non-rotatably to mount the retaining spring 218 to the lever. Adjacent its terminals, the spring 218 is bowed to define a loop 222 within whose confines the spacer 198 is permitted to move while maintaining slide transport lever arrangement 210 and disc assembly 190 in operative interrelationship.

As has been described hereinabove, the power from electric motor 94 is delivered to the shaft 96 from whence it is taken off by means of clutch unit 98 to cause cyclical rotation of spur gear 126. This cyclical rotation of the gear 126 is converted to an oscillatively rotatable movement of operating shaft 108 by means of the power transmitting assembly 106; and this oscillative rotation of the shaft 108 is realized by disc assembly 190; assembly 190 being rigidly attached to one end of shaft 108. Transfer of this oscillative rotation from disc assembly 190 to the slide transport lever arrangement 210 will become apparent from an examination of the sequence shown in FIGS. 13, 14 and 15.

Figures 13, 14:
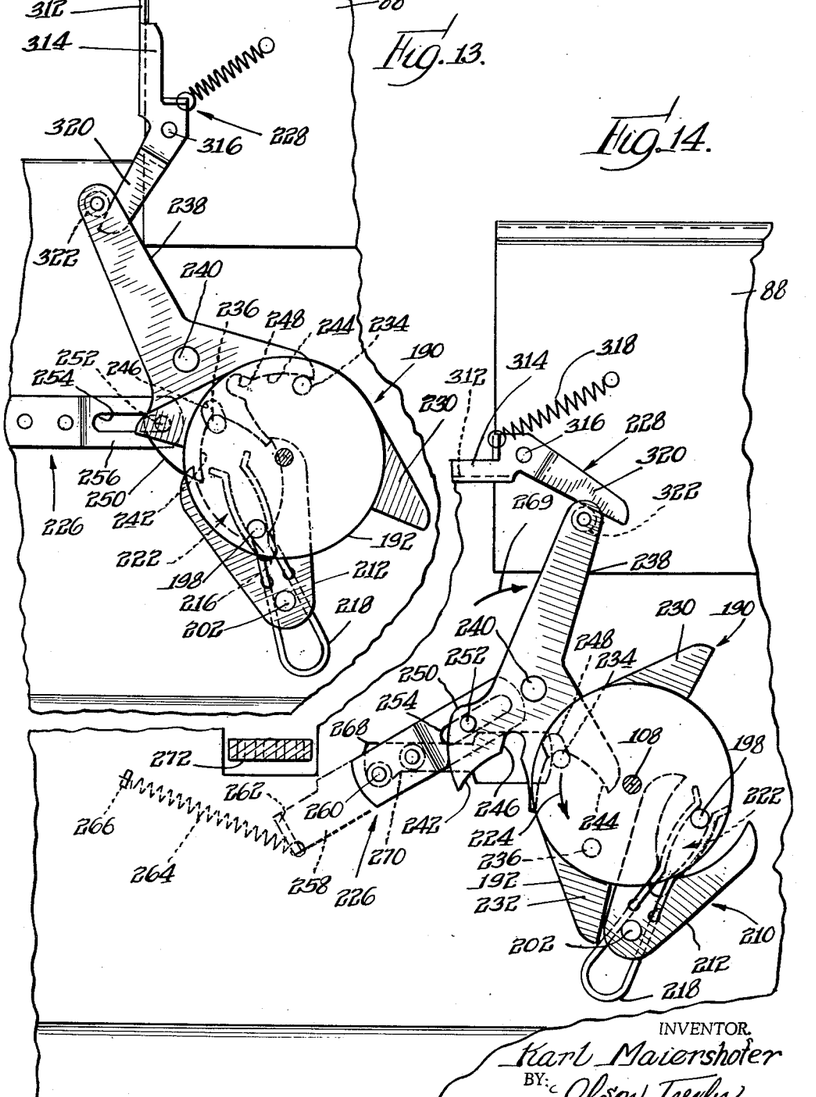
FIG. 13 is a side elevational view taken through the section 13—13 of FIG. 11, illustrating the position of the parts as they appear when opening of the shutter is imminent.
FIG. 14 is a view similar to the showing of FIG. 13 but illustrating the position of the parts as they appear upon actual opening of the shutter.

FIG. 13 illustrates the relative position of the parts as they appear when the pusher arm 208 is in its lowermost or retracted position corresponding to the showing of FIG. 6. This position is also associated both with latched engagement of the arm 134 relative to the strike plate 152 and with disengagement of clutch unit 98 from power shaft 96. Upon actuation of the tripping lever 156, clutch unit 98 engages power shaft 96 whereby to drive the spur gear 126; and at the initiation of this latter activity, the tubular spacer 198 resides in the throat 216; but as spur gear 126 enters its cycle of rotation, the spacer 198 rides out of the throat 216 in accordance with the showing of FIG. 13. Continued rotation of spur gear 126 results in further rotation of operating shaft 108 and corresponding rotation of disc assembly 190 whereupon spacer 198 rides into the loop 222 of retaining spring 218 from the position shown in FIG. 13 to the position shown in FIG. 14 while disc 192 rotates in the direction of arrow 224. Because spring 218 retains the tubular spacer 198 within the loop 222, the slide transport lever arrangement 210 oscillates from the position shown in FIG. 13 to that shown in FIG. 14; and this movement results in a rotation of shaft 202 and a concomitant levering of the pusher arm 208 into its uppermost position.

Figure 15:
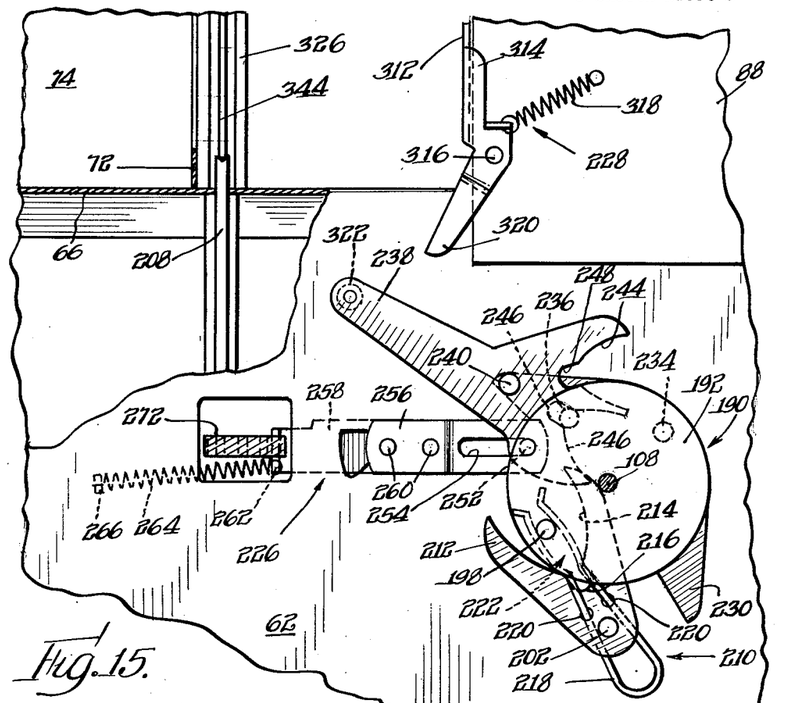
FIG. 15 is a view similar to the showing of FIG. 13 but illustrating the position of the parts as they appear upon actuation of the indexing means to step the slide tray one increment.
Figure 16:
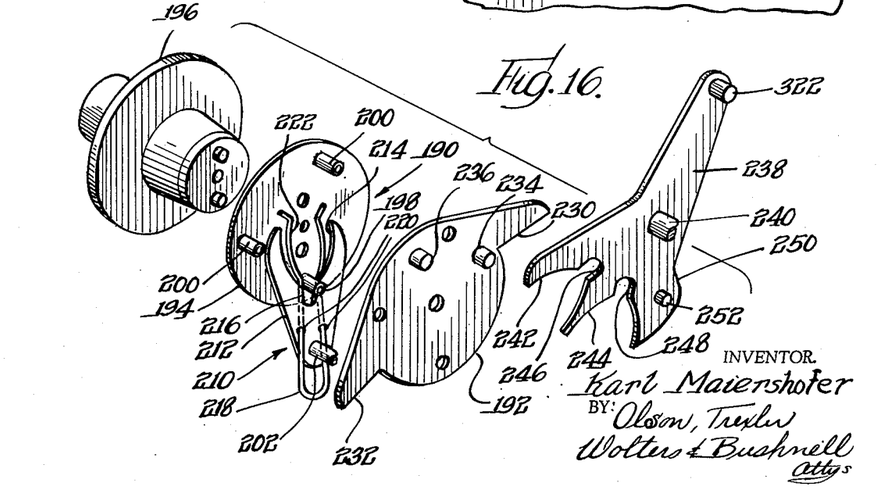
FIG. 16 is an exploded perspective view of the disc assembly and the actuating lever employed in operating the shutter and in indexing the tray.

Thereafter, continued rotation of disc assembly 190 in the general direction of arrow 224, in response to the impetus of the rotating spur gear 126 causes a reverse rotation of the disc assembly 190 through the position shown in FIG. 15 and back to the starting position illustrated in FIG. 13, the pusher arm 208 being correspondingly lowered to its retracted position in the process.

Rotation of disc assembly 190 is also arranged both to index slide tray 50 through the tray tunnel 48 by means of an indexing assembly 226 and to actuate a shutter arrangement 228. For purposes of achieving and coordinating these functions, the disc 192 is provided with wing-like retaining plates 230 and 232 approximately diametrically disposed as is well shown in FIG. 14. In addition, disc 192 is provided with laterally extending cam followers 234 and 236 fixed on the side of disc 192 which faces the side plate member 62. This is shown in FIG. 11.

An actuating lever 238 is pivotally mounted to the side plate member 62 by a stub shaft 240, the lever 238 having an enlarged end provided with cam surfaces coactable with the followers 234 and 236. Specifically, the actuating lever 238 is fashioned with diverging mouths 242 and 244 opening in the general direction of followers 234 and 236. The mouths 242 and 244 communicate respectively with throats 246 and 248 which radiate generally from stub shaft 240 as is well shown in any of FIGS. 13–16. The edges of mouth 242 and throat 246 define a cam surface which is arranged to cooperate with follower 236. Similarly, the edges of mouth 244 and throat 248 define a cam surface which is adapted to cooperate with follower 234.

The oscillative rotation of disc assembly 190 results in the followers 234 and 236 alternately riding on the cooperating cam surfaces of actuating lever 238 whereby to cause an oscillative rotation of the actuating lever. In order to operate the indexing assembly 226, the actuating lever 238 is provided with a heel portion 250; and a pin 252 is raised from portion 250 facing in the general direction of side plate member 62. Pin 252 rides in a slot 254 formed in a link 256; and the indexing assembly 226, in addition to the link 256, includes a pawl 258 which is secured to link 256 on the interior side of plate member 62 by suitable fasteners such as rivets 260, as is well shown in FIG. 11.

Continuing with reference to FIG. 11, the pawl 258 will be seen provided with a hooked end 262 which is biased in a direction generally away from operating shaft 108 by means of a tension spring 264, spring 264 being fastened between the pawl 258 and an ear 266 struck out from the side plate member 62. The shanks of rivets 260 are adapted to act as cam followers for directing the activity of pawl 258; and a stepped cam slot 268 is therefore formed in side plate member 62 to cooperate with actuating lever 238 in cocking and reciprocating the pawl 258.

Considering again the sequence of operations illustrated successively in FIGS. 13, 14 and 15, it will be noted that pin 252 resides in the right-hand end of slot 254, as viewed in FIG. 13, at the moment when spur gear 126 is being initiated into its cycle of rotation. As the spur gear 126 continues through its cycle of rotation and as operating shaft 108 is being oscillatively rotated thereby, the disc assembly 190 is first driven in the direction of arrow 224 and the components are generally altered from the position shown in FIG. 13 to the position shown in FIG. 14. It is important to note that, during the course of this movement, actuating lever 238 is rotated in the direction of arrow 269 whereupon pin 252 bears on the upper edge of slot 254 to cause a cocking of pawl 258, the pawl 258 pivoting about a rise 270 formed in the stepped cam slot 268, rivets 260 coacting with the cam surface of slot 268 for this purpose.

Upon continued rotation of spur gear 126 in its cycle of operation, the rotation of shaft 108 is reversed as is the rotation of disc assembly 190. Rotation of actuating lever 238 is also reversed allowing pawl 258 to be moved generally toward gear 272 under the influence of the tensile force stored in spring 264 by the previous cocking action of the pawl. Under the combined direction of pin 252 and spring 264, pawl 258 is directed to ride into the space between two of the teeth of a pinion 272 from a position generally therebeneath. This is shown in FIG. 15. Continued driving of the disc assembly 190 from the spur gear 126 causes the pawl 258 to be advanced generally to the right side of the figure for stepping the pinion 272 and, as will be brought out more fully hereinafter, concomitant indexing of the slide tray 50 through the tunnel 48. It is to be recognized that indexing of the slide tray 50 is arranged to take place when the pusher arm 208 is retracted out of the path of the slide tray and into its lowermost position.

Turning to a consideration of FIGS. 6 and 11, the pinion 272 will be seen to constitute a part of a gear arrangement that is included in the indexing assembly 226. Specifically, the pinion 272 is fixed to a vertical shaft 274 which is journaled in a C-shaped bracket 276, bracket 276 being secured to the outer face of side plate member 62. A second pinion 278 is also fixed to shaft 274 vertically above pinion 272 and communicating, through an aperture in the side plate member 62, with a rack portion 280 fashioned in a lower edge of the slide tray 50. The teeth of pinion 278 mesh with the rack 280 for purposes of incrementally advancing the slide tray 50 upon stepping of pinion 272 under the action of pawl 258. A detent unit 282 is included with the gear arrangement for purposes of insuring proper stepwise rotation of the pinion 272; and this detent unit includes a leaf spring 284 which is arranged to bias a ball bearing 286 into one of the spaces between the teeth of pinion 272, suitable guides and keepers being provided for the leaf spring 284 and the ball bearing 286.

A manual indexing arrangement is also advantageously provided in the slide projection apparatus of the invention; and this manual indexing arrangement is indicated generally by the numeral 288 in FIG. 6. The arrangement 288 specifically includes a vertical shaft 290 that is journaled between the lower flange of bracket 276 and an L-shaped bracket 292 which is secured to side plate member 62 vertically above the pinions 272 and 278. A manual control disc 294 is fixed to shaft 290 to extend outwardly through an opening formed in housing 32 as is shown in FIG. 1; and returning to FIG. 6, the manual control disc 294 is seen fashioned with a bevelled and knurled edge 296 for facility in its manipulation. Underlying the manual control disc 294 and fixed to shaft 290 to mesh with pinion 278 is a spur gear 298, gear 298 transferring rotative force from manual control disc 294 to the rack 280 through pinion 278 to permit manual indexing of the tray 50.

Advantageously, a counter unit 300 is included with the manual indexing arrangement 288; and as will be seen in FIGS. 5 and 6, the counter unit 300 comprises a drum 302 affixed to a spur gear 304. The drum 302 is peripherally provided with an appropriate number of consecutive numerals or other suitable indicia for purposes of indicating which one of the slides in a given slide-carrying tray is being viewed at any particular instant, the counter unit 300 being provided with a pair of locking cones and a pressure nut, not shown, for releasably securing the counter unit to shaft 290. The drum 302 is additionally fashioned with a knurled flange 306; and a tongue spring 308 is riveted to side plate member 62 to cooperate with the knurled flange 306 in regulating the engagement of spur gear 304 with a pinion gear 310 which is fixed to shaft 274. As will be recognized, this latter connection causes the counter unit 300 to be rotated incrementally as a slide tray is being advanced incrementally through the tray tunnel 48 at such times as the counter unit has been directed down along shaft 290 for intermeshing of gears 304 and 310. If desired, the counter unit 300 may be manually elevated along shaft 290 for disengagement of gears 304 and 310 and corresponding prevention of rotation of the counter unit.

As has been described hereinabove, rotation of disc assembly 190 is arranged to actuate a shutter arrangement 228; and in accordance with a feature of the present invention, the shutter arrangement 228 includes a shutter blade 312, shown in FIGS. 13–15. Shutter blade 312 is hinged to be swung into and out of the optical path which is defined by viewing frame 73, light beam unit 74 and the projection lens assembly enclosed in housing 88. Specifically, blade 312 is formed with flanges 314 extending perpendicularly thereto at the lateral edges thereof, the flanges 314 being drilled to receive an axle 316 which is disposed transversely of and spaced-apart laterally beneath the optical path through viewing frame 73. In one embodiment of the invention, a tension spring 318 is fastened between housing 88 and one of the flanges 314 in order to bias the shutter blade 312 so as normally to obstruct the optical path. The shutter blade 312 may also be advantageously biased into an open condition as will become apparent hereinafter. A stop 319, well shown in FIG. 5, is included on the shutter blade 312 to provide resilient engagement of the shutter blade with the edge of housing 88; and stop 319 desirably includes a rubber bumper fitted on an ear extending laterally from the shutter blade.

In order to provide operative connection between shutter arrangement 228 and disc assembly 190, the flange 314 which is disposed on the same side of side plate member 62 as the disc assembly is fashioned with an extended leg portion 320, and a tubular nylon stop 322 is affixed to the end of actuating lever 238 laterally thereof in a plane with the leg 320.

As will become apparent from an inspection of FIG. 14, the actuating lever 238 is directed to the extremity of its movement in the direction of arrow 269 as the operating shaft 108 is being rotated to raise the pusher arm 208; and when the operating shaft 108 reverses its rotative movement to lower the pusher arm, the actuating lever 238 also reverses its direction of rotation whereby to allow spring 318 to return shutter blade 312 to its closed condition. While the disc assembly 190 is being operated to index the slide-carrying tray, the actuating lever 238 is generally spaced apart from leg 320 of the shutter arrangement, i.e. out of operative engagement therewith.

Turning to FIGS. 7–10, guide blocks 326 and 328 will be seen mounted to the plate 72 at the sides of the viewing frame 73. The guide block 328 is fixedly mounted to the plate 72 by rivets or other suitable means, and the guide block 326 is laterally slidably mounted, being formed with horizontal slots 330 for this purpose. Rivets 332 pass through the slots 330 in a slidable manner, and a post 334 extends laterally from the block 326 to be engaged by a leaf spring 336 which biases the guide block 326 generally in the direction of guide block 328. In addition, guide block 328 is fashioned with a vertical, rectangular groove 338; and the guide block 326 is fashioned with a vertical V-shaped groove 340 and with tapered upper and lower ends 342. Thus, a photographic slide transparency such as the slide 344 can be levered into guided and laterally gripped engagement between the blocks 326 and 328 at the respective grooves thereof.

In compliance with the invention, an editing lever arrangement indicated generally by the numeral 346 is situated adjacent the viewing frame 73. Specifically, the editing lever arrangement 346 includes an operating lever 348 which is pivoted to a post 350. Post 350 extends horizontally from the guide block 328, a manual operating handle 352 is affixed to the lever 348.

Figures 8, 9:
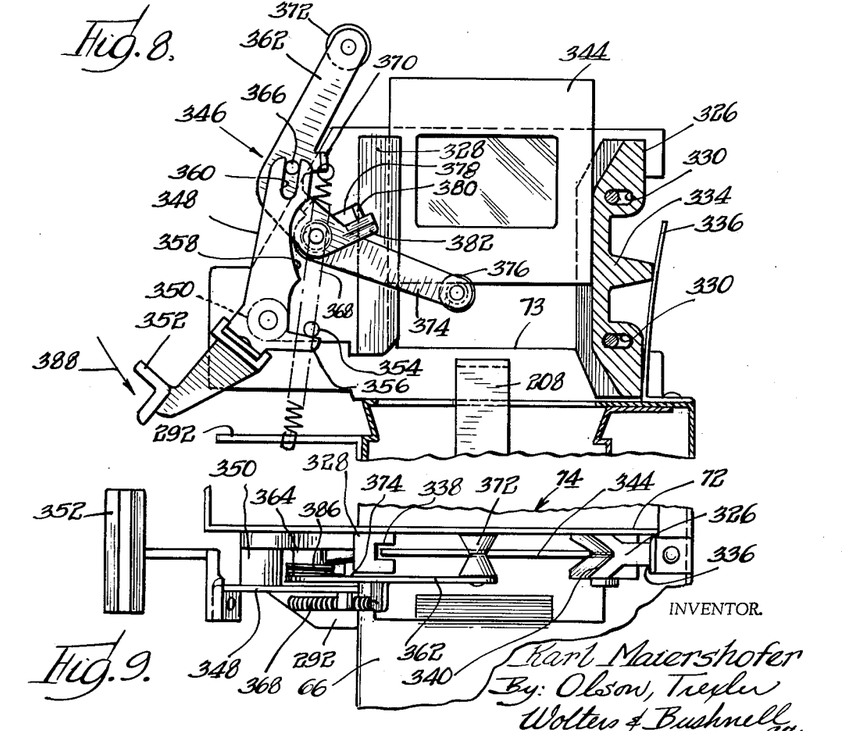
FIG. 8 is a view similar to the showing of FIG. 7 but illustrating the editing lever arrangement operated to raise a slide from viewing position to editing position.
FIG. 9 is a plan view taken through the section 9—9 of FIG. 7.

The path in which operating lever 348 may be swung is restricted by a pin 354 which is affixed to guide block 328 parallel to post 350. A finger 356 and a rise 358 spaced therefrom are fashioned on operating lever 348 to cooperate with pin 354 in defining the extreme positions of lever 348, which positions are illustrated in FIG. 8 and FIG. 6 respectively. The operating lever 348 is also provided with a notch 360 opening away from the post 350; and a back-up lever 362 is swingably mounted to a post 364 that extends horizontally from the guide block 328 generally parallel with the post 350. A pin 366 is secured to one face of back-up lever 362 to ride in the notch 360 of operating lever 348 so as mechanically to couple the operating lever and the back-up lever.

Figure 7:
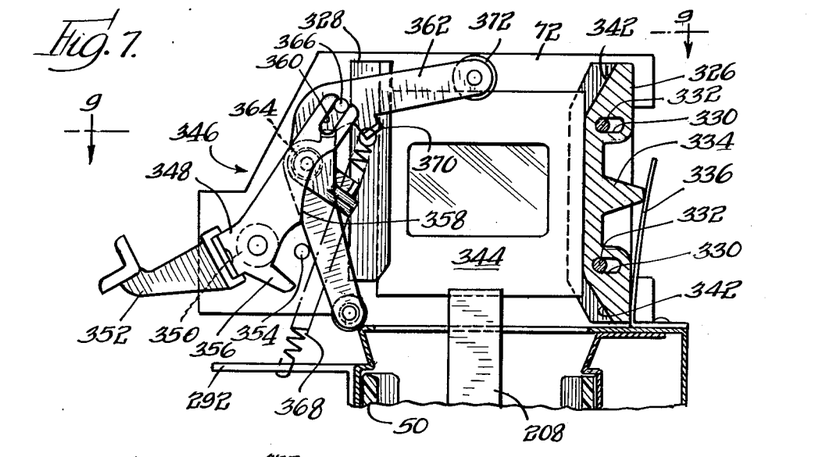
FIG. 7 is a view similar to the upper part of the showing of FIG. 6 but illustrating the editing lever arrangement as it appears with a slide in viewing position.

A tension spring 368 acts between bracket 292 and an ear 370 formed over at an edge of the back-up lever 362 generally adjacent the pin 366. The back-up lever 362 carries a diploconical, nylon roller 372 at its free end coplanar with the pusher arm 208; and the spring 368 biases the arm 362 and its roller 372 generally toward the pusher arm 208 for purposes of gripping the slide 344 between the roller and the grooved end of the pusher arm, as is generally shown in FIG. 7. Upon failure of the pusher arm 208 to lever a photographic slide into the general vicinity of the viewing frame, the spring 368 biases the back-up lever 362 into a depressed condition partially blocking the viewing frame as is shown in FIG. 6.

Figure 10:
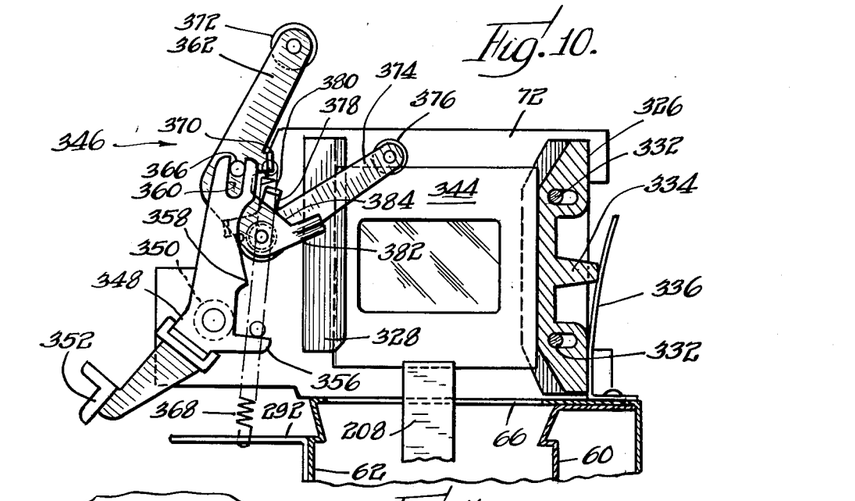
FIG. 10 is a view similar to the showing of FIG. 8 but illustrating the editing lever arrangement as it appears when a slide has been automatically raised into viewing position after the editing lever arrangement has been raised to the editing position.

The editing level arrangement 346 also includes an editing lever 374 which is swingably mounted to the post 364 at a point concentric with the pivotal mounting of back-up level 362. A diploconical roller 376 is affixed to the free end of editing level 374 approximately coplanar with the roller 372, and the editing lever 374 is provided with a finger 378 having a flanged-over tip 380, as is best shown in FIG. 10. This flanged-over tip cooperates with an offset finger 382 fixed on the back-up lever 362 spaced apart along a surface 384 thereof, the finger 382 and an arcuately spaced apart portion of the surface 384 defining stops for the tip 380, thus limiting the swinging movement of editing lever 374 relative to the back-up lever 362. As is best shown in FIG. 9, a torsion spring 386 encircles post 364 and acts between the guide block 328 and editing lever 374 to bias the editing lever in a generally downward direction.

During automatic operation of the slide projection apparatus, the editing lever arrangement 346 operates between the extreme positions shown in FIGS. 6 and 7. When the viewing frame is free of a photographic slide, according to the showing of FIG. 6, the spring 368 draws the back-up lever 362 into the depressed condition shown wherein the rise 358 abuts pin 354. In this position, the interaction of pin 366 and notch 360 likewise urges the operating lever 348 to raise the handle 352 into approximately horizontal condition. Furthermore, the tip 380 of finger 378 is free of finger 382, and the editing lever 374 is therefore capable of being rotated into contact with pin 354 by the action of torsion spring 386.

When a photographic slide is levered from the slide-carrying tray by means of the pusher arm 208, the upper edge of the slide soon contacts the roller 372; and the force of the moving pusher arm raises the back-up lever 362 overcoming the force of biasing spring 268. Eventually, the position of the parts shown in FIG. 7 is achieved. During the course of this movement, the action of biasing spring 368 causes the photographic slide 344 to be gripped between the roller 372 and the end of pusher arm 208. Upon retraction of the pusher arm 208, the biasing spring 368 causes the roller 372 to follow and press against the edge of the photographic slide until it has been almost completely returned to its rest position in the slide-carrying tray.

When it is desired to raise a photographic slide for manual manipulation, specifically through a slot 387 fashioned in the top of housing 32 as is shown in FIG. 1, the handle 352 is manually depressed in the direction indicated in FIG. 8 by the arrow 388. The photographic slide 344 is thereupon raised from contact with the end of the elevated pusher arm 208 by the roller 376 contacting its bottom edge; and since arm 382 is simultaneously brought into abutment with the formed-over tip of finger 378, the editing lever 374 is rotated in a counterclockwise direction as viewed in FIG. 8 to raise the photographic slide into the desired position. After the photographic slide 344 has been manipulated as is desired or replaced, the handle 352 is raised manually to lever the photographic slide into its normal position gripped between the upper end of pusher arm 208 and the roller 372.

It is important to point out that, according to the invention, raising of a photographic slide into viewing position, either manually or automatically, while the editing lever arrangement is raised into the editing position does not tend to incur bending or damage to the slide. As will be observed in FIG. 10, raising of photographic slide 344 by means of pusher arm 208 results in the upper edge of the slide contacting the roller 376 rather than the roller 372 as it would under normal circumstances. Upward motion of the photographic slide, as urged by the pusher arm 208, thereafter causes the editing lever 374 to rotate in a generally counterclockwise direction as viewed in FIG. 10 against the bias of torsion spring 386, the rotation of editing lever 374 incurring a corresponding rotation of the finger 378 from its normal position contacting arm 382 into the position shown in FIG. 10. Thus, the slide 344 is gripped between the pusher arm and the roller 376, and a back-up or return force is applied to the photographic slide in a manner similar to the normal operation described hereinabove in conjunction with back-up lever 362.

Operation of the slide projection apparatus of the invention will be apparent from the above descriptions.

Figure 17:
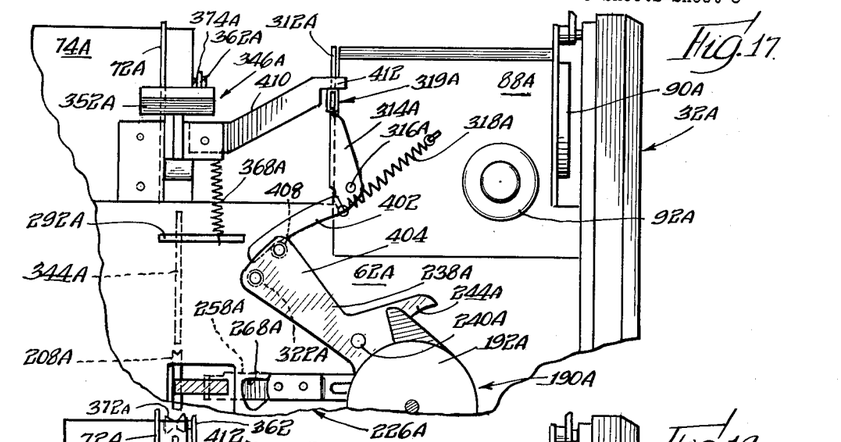
FIG. 17 is a side elevational view of a modified editing lever arrangement, the parts being illustrated as they appear upon imminent opening of the shutter.
Figure 18:
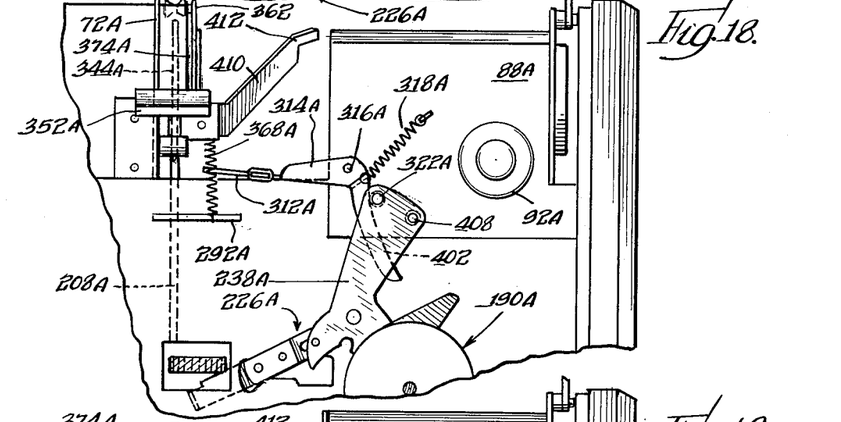
FIG. 18 is a view similar to the showing of FIG. 17 but illustrating the parts as they appear with the shutter operated into its open position and with a slide levered into the viewing frame.
Figure 19:
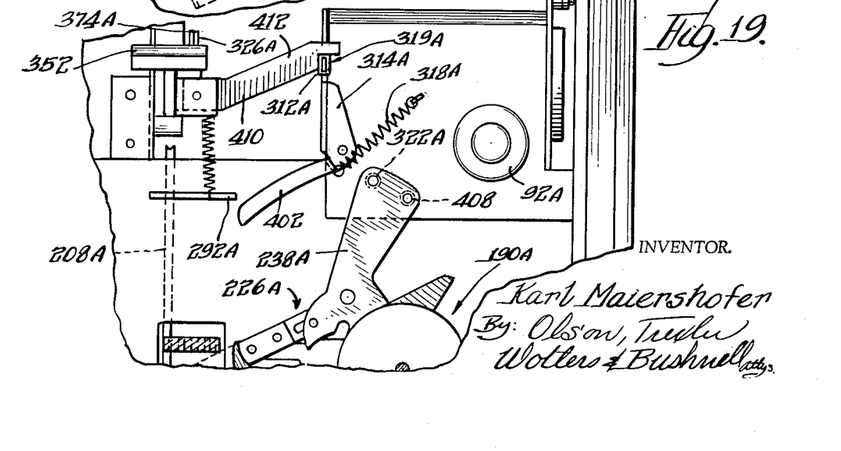
FIG. 19 is a view similar to the showing of FIG. 18 but illustrating retention of the shutter in its closed position in absence of a slide in the viewing frame.

Turning now to FIGS. 17–19, a modified embodiment of the invention will be seen arranged for retention of the shutter blade in closed position until a slide is properly positioned in the viewing frame. Since the embodiment of FIGS. 17–19 is similar in many respects to the embodiment of FIGS. 1–16, like numerals have been used to designate like parts in the several figures, the suffix letter "A" being applied to those parts associated with the embodiment of FIGS. 17–19 which are similar to corresponding parts in the embodiment of FIGS. 1–16. Parts which are peculiar to the embodiment of FIGS. 17–19 are designated by numerals greater than 400.

Specifically, the flange 316A, which is located on the same side of side plate member 62A as the disc assembly 190A, terminates in an arm 402 which forms a more acute angle with the shutter blade 312A than the previously described arm 320. In addition, tension spring 318A extends between the arm 402 and an ear struck out from the housing 88A so as to bias the shutter blade 312 into a generally open position. This distinguishes from the action of spring 318 which was arranged to bias the shutter blade 312 into a generally closed position.

To facilitate its cooperation with the acutely angled arm 402, actuating lever 238A is provided with a coplanar extension 404 which carries a roller 408 at its end adjacent the roller 322A. Furthermore, a crank 410 is mounted on handle 352A to extend a stop finger 412 into the vicinity of the stop 319A which is fixed to shutter blade 312A.

With specific reference to FIG. 17, the projection apparatus will be seen positioned in the rest condition in which pusher arm 208A is retracted and in which the roller 408 has operated an arm 402 to direct the shutter blade 312A against the action of spring 318A and into its position obstructing the optical path through the viewing frame. In FIG. 18, the parts are shown rearranged to illustrate their relative position when the pusher arm 208A has urged the slide 344A into viewing position. There, it will be observed, action of the upraised slide on the roller 372A of back-up lever 374A has resulted in a rotative depression of handle 352A. A corresponding movement of crank 410 has occurred, raising both the finger 412 and the edge of crank 410 which is perpendicular therewith out of blocking engagement with stop 319A, thus allowing the shutter blade 312A to rotate under the influence of spring 318A as the actuating lever 328A rotates in a generally clockwise direction as viewed in the figures. In the course of this rotation of the actuating lever 238A, arm 402 rides from the roller 408 to the roller 322A and into the condition shown in FIG. 18.

However, with reference to FIG. 19, it will be observed that the actuating lever 238A can be rotated into the position releasing the shutter to the action of spring 318A without realizing a lowering of the shutter. Under circumstances which would allow the handle 352A and its associated editing lever 346A to remain in the condition shown in FIG. 17, as might be experienced when, in the course of automatic operation of the projector, an empty stall in the slide tray is encountered, no slide would be raised against the roller 372A of lever 374A and no concomitant rotation of the crank 410 would occur. Accordingly, the surface of crank 410 which is perpendicular to the finger 412 would abut the stop 319A as is shown in FIG. 19 thereby effectively blocking the opening action of the shutter blade 312A.

It is to be recognized that a manual depression of handle 352A, when the parts are positioned as shown in FIG. 19, lifts the crank 410 out of blocking engagement with stop 319A permitting the shutter to snap open in response to the action of spring 318A. If, after releasing the handle 352A, the shutter blade 312A is directed to its closed position by the action of lever 328A, the spring 368A elongates sufficiently to allow crank 410 to deflect. This allows the shutter blade 312A to be directed into its closed position shown in FIG. 17.

The specific examples herein shown and described should be considered as illustrative only. Various changes in structure may occur to those skilled in the art; and these changes are to be understood as forming a part of this invention insofar as they fall within the true spirit and scope of the appended claims.

The invention is claimed as follows:

1. In a photographic slide projector, the combination comprising: drive means including a rotatable power shaft; clutch means movable in a path into and out of engagement with said shaft; mechanical means for moving said clutch means in said path, including a repositionable arm; trippable latch means lockably engageable by one end of said arm; means periodically operating said mechanical means to cause movement of said clutch means out of engagement with said power shaft and to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; means defining a pathway for a slide-carrying tray; indexing means for stepwise advancing a said tray along said pathway; actuating means interconnected between said operating shaft and said indexing means; means defining a viewing frame above said pathway; and pusher arm means including a pusher arm for endwise engaging a photographic slide carried by said tray and means connecting said pusher arm to said operating shaft whereby the oscillatively rotational movement of said operating shaft actuates said pusher arm for transporting a said slide to and from said viewing frame.

2. In a photographic slide projector, the combination comprising: drive means including a rotatable power shaft; clutch means including a friction-surfaced wheel movable in an arcuate path into and out of edgewise engagement with said shaft; mechanical means for moving said wheel in said path, including a repositionable arm; trippable latch means lockably engageable by one end of said arm; means periodically operating said mechanical means to cause movement of said wheel out of engagement with said power shaft and to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; means defining a pathway for a slide-carrying tray; indexing means for stepwise advancing a said tray along said pathway; actuating means interconnected between said operating shaft and said indexing means; means defining a viewing frame above said pathway; and pusher arm means including a pusher arm for endwise engaging a photographic slide carried by said tray and means connecting said pusher arm to said operating shaft whereby the oscillatively rotational motion of said operating shaft actuates said pusher arm for transporting a said slide to and from said viewing frame.

3. In a photographic slide projector, the combination comprising: drive means including a rotatable power shaft; clutch means movable into and out of engagement with said shaft; mechanical means for moving said clutch means in said path including a pivotal and reciprocable arm; trippable latch means lockably engageable by one end of said arm; means periodically operating said mechanical means to cause movement of said clutch means out of engagement with power shaft and to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; means defining a pathway for a slide-carrying tray; indexing means for stepwise advancing a said tray along said pathway, including pinion means meshable with a rack on said tray and a cockable and reciprocable pawl cyclically engaging and rotating said pinion means incrementally; actuating means interconnected between said operating shaft and said indexing means for actuating said pawl; means defining a viewing frame above said pathway; and pusher arm means including a pusher arm for endwise engaging a photographic slide carried by said tray and means connecting said pusher to said operating shaft whereby the oscillatively rotational motion of said operating shaft actuates said pusher arm for transporting a said slide to and from said viewing frame.

4. In a photographic slide projector, the combination comprising: drive means including a rotatable power shaft; clutch means movable in a path into and out of engagement with said shaft; mechanical means for moving said clutch means in said path including a pivotal and reciprocable arm; trippable latch means lockably engageable by one end of said arm; means periodically operating said mechanical means to cause movement of said clutch means out of engagement with said power shaft and to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; means defining a pathway for a slide-carrying tray; indexing means for stepwise advancing a said tray along said pathway, including a first pinion adapted to mesh with a rack on said tray, a second pinion coaxially rigid with said first pinion, a cockable and reciprocable pawl cyclically engaging and rotating said second pinion incrementally, and a detent device operatively engaging one of said pinions releasably to restrain said pinions against undirected rotation; means interconnected between said operating shaft and said indexing means for actuating said pawl; means defining a viewing frame above said pathway; and pusher arm means including a pusher arm for endwise engaging a photographic slide carried by said tray and means connecting said pusher arm to said operating shaft whereby the oscillative rotational motion of said operating shaft actuates said pusher arm for transporting a said slide to and from said viewing frame.

5. In a photographic slide projector, the combination comprising: drive means including a rotatable power shaft; clutch means movable in a path into and out of engagement with said shaft; mechanical means for moving said clutch means in said path including a pivotal and reciprocable arm; trippable latch means lockably engageable by one end of said arm; power transmitting means operative from said clutch means; abutment means eccentrically mounted on said power transmitting means cyclically to abut the other end of said arm for urging said arm into locking engagement with said latch means, the concomitant movement of said arm being transmitted to said clutch means by said mechanical means for disengagement of said clutch means from said power shaft; a rotatable operating shaft spaced apart from said power shaft; means operative between said power transmitting means and said operating shaft to transmit oscillatively rotational motion to said operating shaft; means defining a pathway for slide-carrying tray; indexing means for stepwise advancing a said tray along said pathway; actuating means interconnected between said operating shaft and said indexing means; means defining a viewing frame above said pathway; and pusher arm means including means defining a vertical guideway underlying said pathway, a pusher arm slidably received in said guideway for endwise engaging a photographic slide carried by said tray, and means connecting said pusher arm to said operating shaft whereby the oscillatively rotational motion of said operating shaft vertically slides said pusher arm for transporting a said slide to and from said viewing frame.

6. In a photographic slide projector, the combination comprising: drive means including a rotatable power shaft; clutch means including a friction-surfaced wheel movable in an arcuate path into and out of edgewise engagement with said shaft; mechanical means for moving said wheel in said path, including a pivotal and reciprocable arm; trippable latch means lockably engageable by one end of said arm; power transmitting means including a first gear rotatable with said wheel and a second gear concentric with said arcuate path and meshing with said first gear; abutment means eccentrically mounted on said second gear cyclically to abut the other end of said arm for urging said arm into locking engagement with said latch means, the concomitant movement of said arm being transmitted to said clutch means by said mechanical means for disengagement of said clutch means from said power shaft; a rotatable operating shaft spaced apart from said power shaft in parallel relationship therewith; means operative between said second gear and said operating shaft to transmit oscillatively rotational motion to said operating shaft means defining a pathway for a slide-carrying tray; indexing means for stepwise advancing a said tray along said pathway; actuating means interconnected between said operating shaft and said indexing means; means defining a viewing frame above said pathway; and pusher arm means including means defining a vertical guideway underlying said pathway, a pusher arm slidably received in said guideway for endwise engaging a photographic slide carried by said tray, and means connecting said pusher arm to said operating shaft whereby the oscillatively rotational motion of said operating shaft vertically slides said pusher arm for transporting a said slide to and from said viewing frame.

7. In a photographic slide projector, the combination comprising: structure means defining a pathway for a slide-carrying tray; plate means defining a viewing frame above said pathway; pusher arm means including means defining a vertical guideway underlying said pathway, a pusher arm slidably received in said guideway for endwise engaging a photographic slide carried by said tray, and means sliding said pusher arm for transporting a said slide to and from said viewing frame; means defining an optical path through said viewing frame; editing lever means including a first and a second lever pivoted about a common axis disposed parallel to and spaced laterally apart from said optical path, manually operable lever means connected to said first lever for manually pivoting said first lever in a predetermined arc of movement, and stop means on the free ends of said first and second levers aligned in the plane of said pusher arm in confrontable relationship with the upper end thereof; and means biasing said first and second levers generally toward said pusher arm whereby a said stop means grippably engages a slide being transported by said pusher arm oppositely thereto.

8. In a photographic slide projector, the combination comprising: structure means defining a pathway for a slide-carrying tray; plate means defining a viewing frame above said pathway; pusher arm means including means defining a vertical guideway underlying said pathway, a pusher arm slidably received in said guideway for endwise engaging a photographic slide carried by said tray, and means sliding said pusher arm for transporting a said slide to and from said viewing frame; means defining an optical path through said viewing frame; editing lever means including a first and a second lever pivoted about a common axis disposed parallel to and spaced laterally apart from said optical path, manually operable lever means connected to said first lever for manually pivoting said first lever in a predetermined arc of movement, and diploconical elements on the free ends of said first and second levers aligned in the plane of said pusher arm in confrontable relationship with the upper end thereof; and means independently biasing said first and second levers generally toward said pusher arm whereby a said element grippably engages a slide being transported by said pusher arm oppositely thereto.

9. In a photographic slide projector, the combination comprising: structure means defining a pathway for a slide-carrying tray; plate means defining a viewing frame above said pathway; pusher arm means including means defining a vertical guideway underlying said pathway, a pusher arm slidably received in said guideway for endwise engaging a photographic slide carried by said tray, and means reciprocally sliding said pusher arm for transporting a said slide to and from said viewing frame; means defining an optical path through said viewing frame; editing lever means including a first and a second lever pivoted about a common axis disposed parallel to and spaced laterally apart from said optical path, manually operable lever means connected to said first lever for manually pivoting said first lever in a predetermined arc of movement, and stop means on the free ends of said first and second levers aligned in the plane of said pusher arm in confrontable relationship with the upper end thereof; means biasing said first and second levers generally toward said pusher arm whereby a selected stop means grippably engages a slide being transported by said pusher arm oppositely thereto; and interengageable means acting between said levers to cause said second lever to pivot in conjunction with said first lever in one direction and to free said second lever for additional movement in said one direction.

10. In a photographic slide projector, the combination comprising: structure means defining a viewing frame; means defining an optical path through said viewing frame; shutter means for selectively obstructing the passage of light rays along said optical path; means biasing said shutter means into open position; first stop means engageable with said shutter means for opposing said biasing means; second stop means engageable with said shutter means and opposing said biasing means independently of said first stop means; slide transport means; means operative in response to the presence of a photographic slide in said viewing frame for disengaging said first stop means; and means operative with said slide transport means for disengaging said second stop means.

11. In a photographic slide projector, the combination comprising: structure means defining a pathway for a slide-carrying tray; means defining a viewing frame above said pathway; means defining an optical path through said viewing frame; oscillatively rotatable operating shaft means; pusher arm means including a pusher arm reciprocably mounted for reversible movement perpendicular to said pathway and means connecting said pusher arm to said operating shaft means whereby the oscillatively rotatable motion of said shaft means reciprocates said pusher arm for endwise engaging and transporting a photographic slide to and from said viewing frame; shutter means for selectively obstructing the passage of light rays along said optical path including a shutter blade and means hinging said shutter blade for swinging movement into and out of said optical path, the hinge axis of said shutter blade being disposed transversely of and spaced apart from said optical path; means normally biasing said shutter blade to free said optical path; first abutment means on said shutter blade; editing lever means including a back-up lever confrontable with the upper end of said pusher arm and manually operable lever means connected to said back-up lever; extension arm means rigid with said manually operable lever means for selectively engaging said first abutment means to oppose the movement of said shutter blade urged by said biasing means; second abutment means on said shutter blade; shutter lever means operated from said shaft means for selectively engaging said second abutment means to oppose the movement of said shutter blade urged by said biasing means, said shutter lever means being disengaged from said second abutment means when said shaft means has moved said pusher arm to its uppermost position, presence of said slide between said pusher arm and said back-up lever reacting on said manually operable lever means to swing said extension arm out of engagement with said first abutment means when said pusher arm reaches its uppermost position and when said shutter lever means is disengaged from said second abutment means.

12. In a photographic slide projector the combination comprising: drive means including a rotatable power shaft; clutch means movable in a path into and out of engagement with said shaft; mechanical means for moving said clutch means in said path including a pivotal and reciprocable arm; trippable latch means lockably engageable by the one of said arm; means periodically operating said mechanical means to cause movement of said clutch means out of engagement of said power shaft and to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; structure means defining a pathway for a slide-carrying tray; plate means defining a viewing frame above said pathway; pusher arm means including a pusher arm reciprocably mounted for reversible movement perpendicular to said pathway and means connecting said pusher arm to said operating shaft whereby the oscillatively rotatable motion of said operating shaft reciprocates said pusher arm for endwise engaging and transporting a photographic slide to and from said viewing frame; means defining an optical path through said viewing frame; shutter means for selectively obstructing the passage of light rays along said optical path including a shutter blade and means hinging said shutter blade for swinging movement into and out of said optical path, the hinge axis of said shutter blade being disposed transversely of and spaced apart from said optical path; means normally biasing said shutter blade to free said optical path; first abutment means on said shutter blade; editing lever means including a back-up lever confrontable with the upper end of said pusher arm and manually operable lever means connected to said back-up lever; extension arm means rigid with said manually operable lever means for selectively engaging said first abutment means to oppose the movement of said shutter blade urged by said biasing means; second abutment means on said shutter blade; shutter lever means operated from said shaft means for selectively engaging said second abutment means to opposite the movement of said shutter blade urged by said biasing means, said shutter lever means being disengaged from said second abutment means when said shaft means has moved said pusher arm to its uppermost position, presence of a said slide between said pusher arm and said back-up lever reacting on said manually operable lever means to swing said extension arm out of engagement with said first abutment means when said pusher arm reaches its uppermost position and when said shutter lever means is disengaged from said second abutment means.

13. In a photographic slide projector, the combination comprising: drive means including a rotatable power shaft; clutch means movable in a path into and out of engagement with said shaft; mechanical means for moving said clutch means in said path including a pivotal and reciprocable arm; trippable latch means lockably engageable by one end of said arm; means periodically operating said mechanical means to cause movement of said clutch means out of engagement with said power shaft and to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; structure means defining a pathway for a slide-carrying tray; indexing means for stepwise advancing a said tray along said pathway; actuating means interconnected between said operating shaft and said indexing means; plate means defining a viewing frame above said pathway; pusher arm means including means defining a vertical guideway underlying said pathway, a pusher arm slidably received in said guideway for endwise engaging a photographic slide carried by said tray, and means connecting said pusher arm to said operating shaft whereby the oscillatively rotational motion of said operating shaft slides said pusher arm for transporting said slide to and from said viewing frame; means defining an optical path through said viewing frame; editing lever means including a first and a second lever pivoted about a common axis disposed parallel to and spaced laterally apart from said optical path, manually operable means connected to said first lever for pivoting said first lever in a predetermined arc of movement, and stop means on the free ends of said first and second levers aligned in the plane of said pusher arm in comfortable relationship with the upper end thereof; and means biasing said first and second lever generally toward said pusher arm whereby a ssaid stop means grippably engages a slide being transported by said pusher arm oppositely thereto.

14. In a photographic slide projector, the combination comprising: drive means including a rotatable power shaft; clutch means movable in a path into and out of engagement with said shaft; mechanical means for moving said clutch means in said path including a pivotal and reciprocable arm; trippable latch means lockably engageable by one end of said arm; means periodically operating said mechanical means to cause movement of said clutch means out of engagement with said power shaft to cause lockable engagement of said arm and said latch means, including power transmitting means operative from said clutch means; a rotatable operating shaft spaced apart from said power shaft; means operative between said power transmitting means and said operating shaft to transmit oscillatively rotational motion to said operating shaft; structure means defining a pathway for a slide-carrying tray; indexing means for stepwise advancing a said tray along said pathway, including pinion means adapted to mesh with a rack on said tray and a cockable and reciprocable pawl cyclically engaging and rotating said pinion means; actuating means interconnected between said operating shaft and said indexing means for actuating said pawl; plate means defining a viewing frame above said pathway; pusher arm means including means defining a vertical guideway underlying said pathway, a pusher arm slidably received in said guideway for endwise engaging a photographic slide carried by said tray, and means connecting said pusher arm to said operating shaft whereby the oscillatively rotational motion of said operating shaft vertically slides said pusher arm for transporting a said slide to and from said viewing frame; means defining an optical path through said viewing frame; shutter means for selectively obstructing the passage of light rays along said optical path, including a shutter blade and means hinging said shutter blade for swinging movement into and out of said optical path, the hinge axis of said shutter blade being disposed transversely of and spaced apart laterally from said optical path; shutter lever means operated by said actuating means for swinging said shutter blade to free said optical path when said pusher arm has reached its vertically uppermost position; editing lever means including a first and a second lever pivoted about a common axis disposed parallel to and spaced laterally apart from said optical path, manually operable lever means connected to said first lever for pivoting said first lever in a predetermined arc of movement, and stop means on the free ends of said first and second levers aligned in the plane of said pusher arm in confrontable relationship with the upper end thereof; means independently biasing said first and second levers generally toward said pusher arm whereby a said stop means grippably engages a slide being transported by said pusher arm oppositely thereto; and interengageable means acting between said levers to cause said second lever to pivot in conjunction with said first lever in one direction and to free said second lever for additional movement in said one direction.

15. In a photographic slide projector, the combination comprising: drive means including a unidirectionally rotatable power shaft; a rotatable main shaft spaced apart from said power shaft; means mechanically connecting said shafts for converting the unidirectional rotation of said power shaft to an arcuately limited and reversing, cyclical rotation of said main shaft; said shaft connecting means comprising an eccentric drive stud carried from and driven by said power shaft and a rocking member fixed on said main shaft and having a cam slot therein receiving said drive stud; structure means defining a viewing frame; slide transport means operative from said main shaft for transporting a slide to and from said viewing frame; and means delivering a plurality of photographic slides one at a time into operative relationship with said transport means.

16. In a photographic slide projector, the combination comprising: drive means including a unidirectionally rotatable power shaft; a rotatable main shaft spaced apart from said power shaft; means mechanically connecting said shafts for converting the unidirectional rotation of said power shaft to an arcuately limited and reversing, cyclical rotation of said main shaft; structure means defining a viewing frame; slide transport means operative from said main shaft for transporting a slide to and from said viewing frame, including a reciprocal pusher arm means delivering a plurality of photographic slides one at a time into operative relationship with said transport means; and editing lever means including a lever pivotal in a plane parallel to said viewing frame and aligned with said pusher arm, further including means biasing said lever toward said arm for gripping a slide therebetween and providing force tending to return said slide from its position adjacent said viewing frame.

17. In a photographic slide projector, the combination comprising: drive means including a unidirectionally rotatable power shaft; a rotatable main shaft spaced apart from said power shaft; means mechanically connecting said shafts for converting the unidirectional rotation of said power shaft to an arcuately limited and reversing, cyclical rotation of said main shaft; said shaft connecting means comprising an eccentric drive stud carrier from and driven by said power shaft and a rocking member fixed on said main shaft and having a cam slot therein receiving said drive stud; structure means defining a viewing frame; slide transport means operative from said main shaft for transporting a slide to and from said viewing frame; means delivering a plurality of photographic slides one at a time into operative relationship with said transport means; and shutter means for selectively obstructing the passage of light along a path through said viewing frame, including a shutter blade operative from said main shaft and swingable about an axis disposed parallel to the plane of said viewing frame.

18. In a photographic slide projection, the combination comprising a projection lens, a light source spaced behind said lens and substantially on the optical axis thereof slide supporting means between said light source and said projection lens for supporting a slide in projecting position between said light source and said projection lens, a shutter disposed between said slide supporting means and said projection lens substantially transverse of the optical axis of said lens and blocking transmission of light through said lens means pivotally mounting said shutter for pivoting movement about a pivot axis transverse of the lens optical axis and displaced laterally thereof between the aforesaid light-blocking position a pivotted non-blocking position and means for pivoting said shutter between such positions, and means for shifting a slide in and out of said slide supporting means wherein said shutter pivoting means includes a part engageable by a slide shifted into said supporting means, said shutter pivoting means being ineffective to pivot said shutter away from light-blocking position in the absence of engagement of a slide with said part.

19. In a photographic slide projector, the combination comprising drive means including a rotatable power shaft, a driven rotary member, and clutch means interconnecting said rotatable power shaft and said rotary driven member, said clutch means comprising rotary idler means, a support arm rockable about the axis of said rotary driven means and rotatably carrying said rotary idler means thereon in rotary driving engagement with said rotary driven means, means including a toggle connected to said support arm and operative arcuately to move said support arm to shift said idler means into and out of driving engagement with said power shaft, means for selectively operating said toggle in one direction to effect shifting of said idler means into engagement with said power shaft, and means operatively interconnecting said rotary driven means and said toggle for operating said toggle in the opposite direction after a predetermined degree of rotation of said driven means to move idler means out of driving engagement with said power shaft.

20. The combination as set forth in claim 19 wherein the means for selectively operating the toggle in one direction and the means interconnected with the rotatable means for operating the toggle in the opposite direction comprising a common member connected to said toggle, a spring urging said common member in a given direction, latch means for restraining said common member against the force of said spring, a selectively operable mechanism for releasing said latch, said rotary driven means having an abutment thereon engageable with said common member after said predetermined rotation to force said common member against said spring into position for engagement by said latch.

References Cited in the file of this patent
UNITED STATES PATENTS

| | | |
|---|---|---|
| 1,161,660 | Guerzoni et al. | Nov. 23, 1915 |
| 2,401,506 | Pechranz | June 4, 1946 |
| 2,968,993 | Briskin et al. | Jan. 24, 1961 |

UNITED STATES PATENT OFFICE
CERTIFICATE OF CORRECTION

Patent No. 3,138,062 June 23, 1964

Karl Maiershofer

It is hereby certified that error appears in the above numbered patent requiring correction and that the said Letters Patent should read as corrected below.

Column 3, line 49, for "51" read -- 52 --; column 4, line 26, for "viciniaty" read -- vicinity --; column 10, lines 39, 42 and 43, for "level", each occurrence, read -- lever --; column 17, line 21, for "opposite" read -- oppose --; line 67, for "comfortable" read -- confrontable --; line 70, for "ssaid" read -- said --; column 19, line 21, for "carrier" read -- carried --.

Signed and sealed this 24th day of November 1964.

(SEAL)
Attest:

ERNEST W. SWIDER
Attesting Officer

EDWARD J. BRENNER
Commissioner of Patents